United States Patent [19]

Richard

[11] Patent Number: 5,699,186

[45] Date of Patent: Dec. 16, 1997

[54] MULTI-FOLD OPTICAL MAGNIFIER FOR USE IN IMAGE MANIFESTATION APPARATUS

[75] Inventor: Fred V. Richard, Scottsdale, Ariz.

[73] Assignee: Motorola, Inc., Schaumburg, Ill.

[21] Appl. No.: 415,285

[22] Filed: Apr. 3, 1995

[51] Int. Cl.⁶ .............. G02B 5/18; G02B 27/14; G02B 17/00; G02B 5/04

[52] U.S. Cl. .............. 359/569; 359/568; 359/630; 359/638; 359/833; 359/834; 359/728

[58] Field of Search .............. 359/833, 834, 359/835, 619, 630, 631, 726, 728, 729, 730, 741, 742, 638, 565, 566, 569, 572, 573; 353/38, 78; 349/4, 6

[56] References Cited

U.S. PATENT DOCUMENTS

| | | |
|---|---|---|
| 4,896,952 | 1/1990 | Rosenbluth .............. 359/638 |
| 5,530,586 | 6/1996 | Yasugaki .............. 359/630 |
| 5,539,578 | 7/1996 | Togino et al. .............. 359/630 |
| 5,543,966 | 8/1996 | Meyers .............. 359/565 |
| 5,546,227 | 8/1996 | Yasugaki et al. .............. 359/630 |
| 5,596,433 | 1/1997 | Konuma .............. 359/630 |

*Primary Examiner*—Paul M. Dzierzynski
*Assistant Examiner*—Audrey Chang
*Attorney, Agent, or Firm*—Eugene A. Parsons

[57] ABSTRACT

A multi-fold optical magnifier includes a prism with four reflecting surfaces positioned to direct light from an inlet to an outlet, and a lens positioned adjacent the prism outlet to receive light from the prism. An aspheric surface of the lens is in the light path for aberration correction and diffractive optical elements formed on the prism and lens are positioned in the light path to provide further aberration correction. The prism and lens angularly magnify an image source at the prism inlet by greater than ten. The total distance, orthogonal to the source plane, between the prism inlet and the lens outlet is 10 to 15 millimeters.

33 Claims, 4 Drawing Sheets

FIG. 5
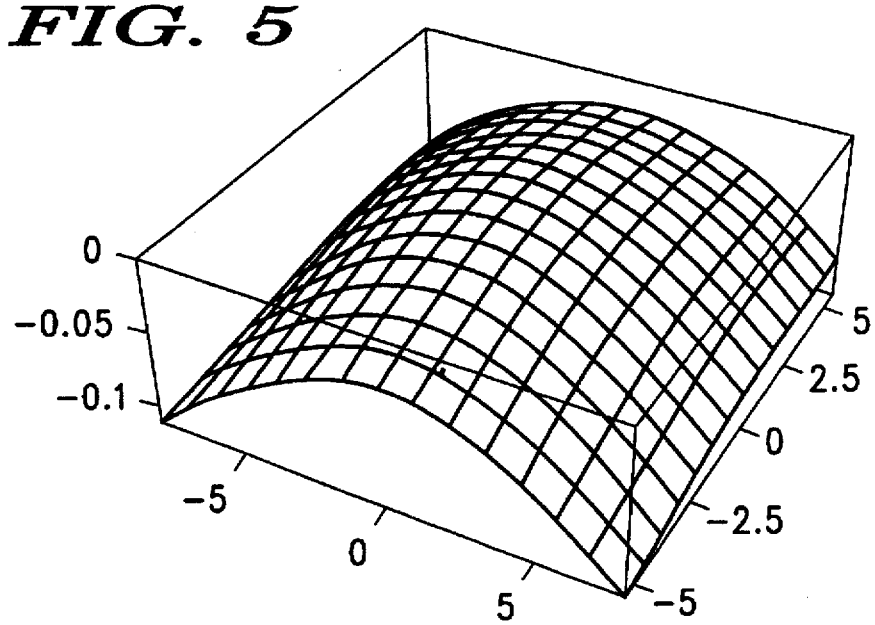
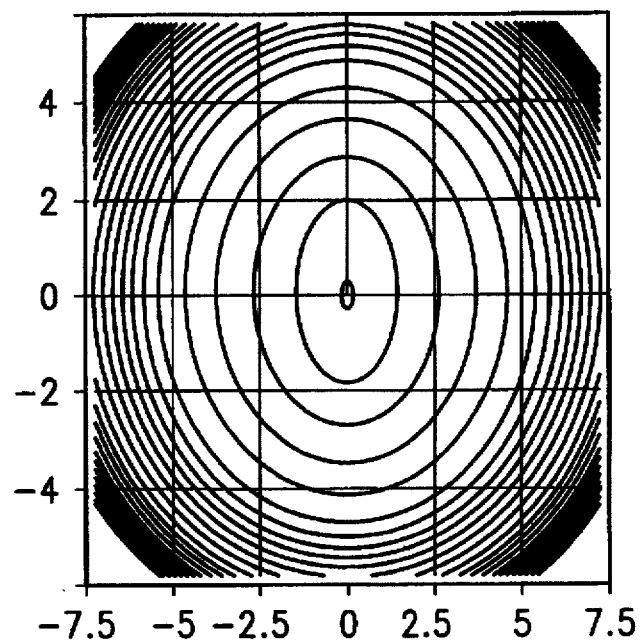
FIG. 6

MULTI-FOLD OPTICAL MAGNIFIER FOR USE IN IMAGE MANIFESTATION APPARATUS

FIELD OF THE INVENTION

The present invention pertains to optical magnifiers and more specifically to optical magnifiers incorporating multi-folds in the optical path so as to minimize the magnifier thickness.

BACKGROUND OF THE INVENTION

With the advent of the communications era, one of the major markets for optical devices is portable electronics equipment, such as cellular telephones, pagers, two-way radios, data banks, computers and the like. Generally, it is desirable that the optical source devices in this type of equipment are compact with low power, inexpensive and include high quality optics with large angular magnification. However, large angular magnification requires a small focal length, as can be seen from the relationship for angular magnifying power (MP) set forth below. Generally, in the discussion below the optical system is treated as a single lens for convenience in describing the relationships.

$$MP = V(b+f)/[f(b+e)]$$

where:

V is a constant, the distance of distinct vision (approximately 10" or 254 mm);

b is the distance from the lens to the virtual image;

e is the distance from the lens to the eye; and f is the effective focal length.

A small effective focal length in turn requires that the optical system have a small F/No., which translates into a fast system in the applications being described. Generally, a fast system is defined as a system with an F/No. less than or equal to approximately 2. As is known in the art, the F/No. is determined by the ratio of the focal length to the diameter of the lens.

Thus, as the focal length is reduced and the system is made smaller, it is inherent that a larger area of the lens, or lens system, is used. This use of a larger area of the lens system results in greater aberration in wavefronts transmitted through the system and a need for greater aberration correction. As is well understood by those skilled in the art, greater aberration correction means more elements in the system, which in turn means larger size and greater cost. Therefore, a major problem that is inherent in any attempts to produce compact, inexpensive, high quality optics with large angular magnification is a compact method for aberration correction.

PRIOR ART

Several different attempts have been made to provide optical systems for portable electronic devices, one of which includes all refractive or reflective optics with a single line of pixels and a vibrating mirror. The single line of pixels is sequenced through the rows of a raster and, simultaneously, the vibrating mirror scans the line of pixels to properly position each subsequent row in its proper orientation. The problem with this system is the high accuracy of timing required, the amount of power used and the blurring of the ultimate image by the vibrations of the mirror. Also, this system is extremely fragile and not conveniently adaptable to the rough use normally occurring in portable equipment.

The system that is normally used at the present time is one using a large image source and either a direct view image or low magnification optics. The major problem with this system is that it greatly limits the size of the portable electronics on which it is used. Basically, the image must be large enough for an operator to read and/or understand the information being displayed. Thus, for example, if one wanted to display an 8.5" by 11" sheet of paper (a standard letter), the direct view display must be 8.5" by 11" to be easily read. Such a display is clearly too large to be incorporated into most portable communications devices, such as pagers, two-way radios, cellular phones and the like.

It would be highly desirable to devise an optical system with the attributes of being compact and inexpensive, and including high quality optics with large angular magnification, while correcting for aberrations.

It is a purpose of the present invention to provide a very small, especially in the depth dimension, compact and relatively inexpensive optical magnifier.

It is another purpose of the present invention to provide a very small, compact and relatively inexpensive optical magnifier which includes high quality optics with relatively large angular magnification.

It is still another purpose of the present invention to provide a very small, compact and relatively inexpensive optical magnifier which includes high quality optics with relatively large angular magnification with a compact means for aberration correction.

It is a further purpose of the present invention to provide a, compact and relatively inexpensive optical magnifier which includes high quality optics with relatively large angular magnification with a compact means for aberration correction, which is small enough, especially in the depth dimension, to conveniently fit in portable electronic equipment.

SUMMARY OF THE INVENTION

The above problems and others are substantially solved and the above purposes and others are realized in a multi-fold optical magnifier including a plurality of optical elements including an optical prism having a light inlet and a light outlet with at least one reflecting surface optically positioned between the inlet and the outlet so as to direct light from the inlet to the outlet and an optical lens positioned adjacent the light outlet of the prism so as to receive light from the prism. The plurality of optical elements define a light path from a path inlet to a path outlet with at least one aspheric surface formed on one of the plurality of optical elements and positioned in the light path for aberration correction and at least one diffractive optical element formed on one of the plurality of optical elements and positioned in the light path so as to provide further aberration correction. The plurality of optical elements are constructed to angularly magnify an image source at the light inlet of the first optical element by greater than ten.

The above problems and others are substantially solved and the above purposes and others are further realized in image manifestation apparatus including an image generator having a two dimensional array of light emitting devices formed on a single substrate and driver circuits coupled to the light emitting devices and including a data input terminal. The light emitting devices are individually addressable by the driver circuits so as to generate a real image including one of a plurality of lines of alpha-numerics and graphics from data received at the data input.

A multi-fold optical magnifier is positioned adjacent the image generator so as to receive the real image generated by the image generator and produce a virtual image at an output thereof. The magnifier has a plurality of optical elements including an optical prism having a light inlet and a light outlet with at least one reflecting surface optically positioned between the inlet and the outlet so as to direct light from the inlet to the outlet and an optical lens positioned adjacent the light outlet of the prism so as to receive light from the prism. The plurality of optical elements define a light path from a path inlet to a path outlet with at least one aspheric surface formed on one of the plurality of optical elements and positioned in the light path for aberration correction and at least one diffractive optical element formed on one of the plurality of optical elements and positioned in the light path so as to provide further aberration correction. The plurality of optical elements are constructed to angularly magnify the real image at the light inlet of the first optical element by greater than ten.

BRIEF DESCRIPTION OF THE DRAWINGS

Referring to the drawings:

FIG. 5 is a three dimensional plot illustrating the phase correction required at another surface of the multi-fold optical magnifier illustrated in FIG. 1;

FIG. 6 is a contour plot of the three dimensional surface illustrated in FIG. 5, which simulates the pattern of a diffractive optical element built into a surface of the multi-fold optical magnifier of FIG. 1;

DESCRIPTION OF THE PREFERRED EMBODIMENTS

Figure 1:
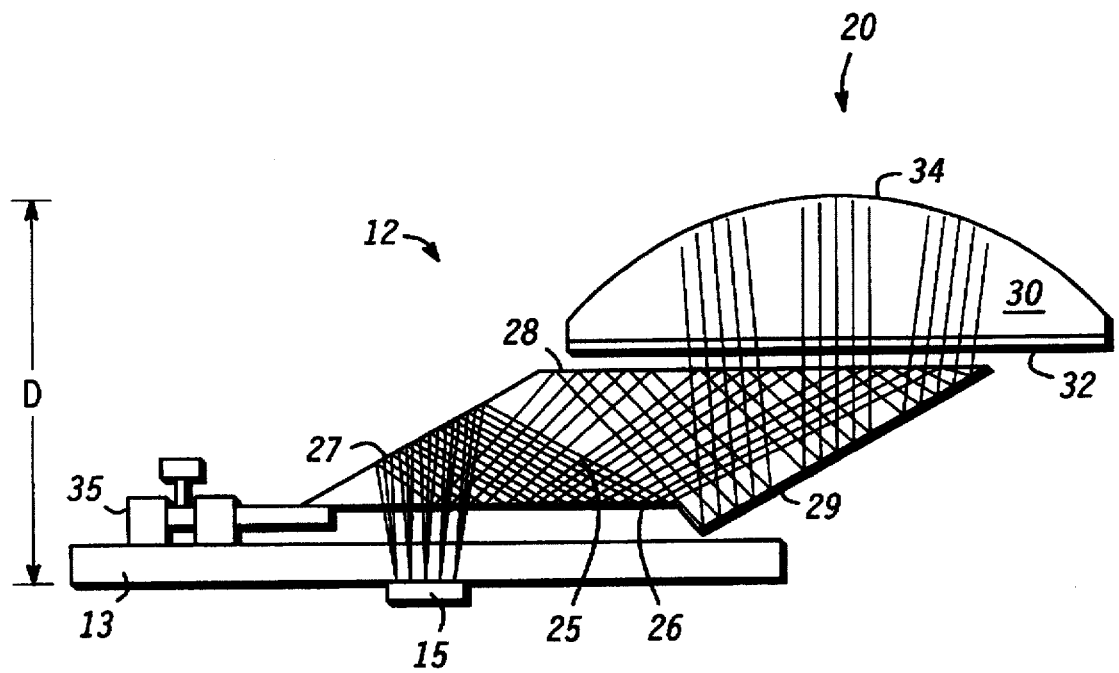
FIG. 1 is an enlarged, simplified view in side elevation of image manifestation apparatus employing a multi-fold optical magnifier in accordance with the present invention.

Referring specifically to FIG. 1, image manifestation apparatus 10 including a multi-fold optical magnifier 12 is illustrated. Apparatus 10 includes a support substrate 13 with an image generator 15 mounted on the lower surface thereof. As will be explained in more detail presently, image generator 15 generates a real image which, in this specific embodiment, is transmitted through support substrate 13. In this embodiment support substrate 13 is formed of optical quality glass, plastic, or other transparent material to facilitate the transmission of a real image therethrough. It will of course be understood that some embodiments allow image generator 15 to be mounted on the upper surface of support substrate 13 and, in these instances support substrate 13 can be constructed of any convenient material and does not need to be transparent.

Image generator 15 includes a two dimensional array of light emitting devices, such as organic or inorganic LEDs, field emission devices, vertical cavity surface emitting lasers, LCDs, etc. In this specific embodiment, the two dimensional array includes 56 light emitting devices by 164 light emitting devices. Each light emitting device is fabricated approximately 20 microns on a side with a center-to-center spacing between adjacent devices of no more than 20 microns, resulting in a total size of the array, or real image, of 1.12 millimeters by 3.28 millimeters. Each light emitting device is turned ON with approximately 1.8 volts and utilizes approximately 50 µA of current when it is turned ON. Two dimensional array 15 produces a luminance less than approximately 15 fL.

Image generator 15 is mounted on the under-surface of support substrate 13 and a driver board (not shown) is bump-bonded to substrate 13. Additional information on driver boards and bonding of substrates to the driver boards is disclosed in a copending United States patent application entitled "Integrated Electro-optical Package", Ser. No. 08/216,995, filed on Mar. 24, 1994 and assigned to the same assignee, which information is included herein by reference. In an alternate embodiment, driver chips may be bump bonded directly to substrate 13.

Multi-fold optical magnifier 12 is also mounted on substrate 13 (illustrated schematically) and includes a plurality of optical elements defining a light path from image generator 15 to a viewing aperture, designated by arrow 20. The plurality of optical elements are constructed to angularly magnify images, generated by image generator 15, by a power greater than ten. Because of the limited size of the various surfaces in the optical path and the size of image generator 15 (the real image is 1.12 by 3.28 millimeters), the horizontal field of view of the optics for the specific embodiment illustrated is approximately 11 degrees at a magnification of 15×.

The plurality of optical elements of magnifier 12 includes an optical prism 25 having a first surface 26, a second surface 27, a third surface 28 and a fourth surface 29, as well as side surfaces which will be understood. First surface 26 defines a light input for optical prism 25 and third surface 28 defines a light output, as will be explained in more detail presently. Optical prism 25 is constructed with second surface 27 of the optical prism positioned to receive light from the light input (defined by first surface 26) and reflect the received light back onto first surface 26. Because the light from the light input strikes second surface 27 at an acute angle, second surface 27 is aluminized or silvered to form a mirror for the reflection of the received light. First surface 26 is positioned to reflect light received from second surface 27 onto third surface 28. The light received from second surface 27 strikes first surface 26 at an angle greater than 42° and is reflected by total internal reflection. Third surface 28 is positioned to reflect light received from first surface 26 onto fourth surface 29. The light received from first surface 26 strikes third surface 28 at an angle greater than 42° and is again reflected by total internal reflection. Fourth surface 29 is positioned to reflect light received from third surface 28 through the light outlet of the optical prism defined by third surface 28. Fourth surface 29 is aluminized or silvered to form a mirror for the reflection of received light.

It should be noted that although surfaces 26 and 28 are parallel and spaced apart and surfaces 27 and 29 are parallel and spaced apart, prism 25 is not a true parallelepiped because surface 29 is slightly larger than surface 27. This difference in size results in a slight discontinuity in surface 26. In this specific embodiment, optical prism 25 is molded from an optical quality plastic and may be, for example, either injection molded or injection compression molded. Generally, it is understood that optical quality plastic is material having an index of refraction, between approximately 1.5 and 1.6. The difference between the high index of refraction of the material forming prism 25 and the low index of refraction of any surrounding material (such as air) produces a waveguiding effect in prism 25, resulting in the total internal reflections at surfaces 26 and 28. Reflecting surfaces 27 and 29 may be a separate mirror that is simply molded into element 25, or surfaces 27 and 29 can be aluminized or silvered after formation of prism 25.

The plurality of optical elements further includes an optical lens 30 having a light inlet surface 32, positioned adjacent the light outlet (surface 28) of optical prism 25, and a light outlet surface 34. In the specific embodiment illustrated, optical lens 30 is a biaspheric optical lens having an aspheric surface defining light inlet surface 32 and an aspheric surface defining light outlet surface 34. Optical lens 30 is fixedly mounted relative to optical prism 25 by any convenient means including an outer housing, a mounting frame, or any other convenient structure. The aspheric surfaces, including light outlet surface 34 and light inlet surface 32 are designed to reduce and/or eliminate any aberration in wavefront as it passes along the light path from the light inlet of magnifier 12 to light outlet surface 34.

Also, the plurality of optical elements, including optical prism 25 and optical lens 30, are constructed to include at least one diffractive optical element positioned in the light path so as to provide additional aberration correction. In the embodiment illustrated, diffractive optical elements are incorporated into each of the reflecting surfaces 27 and 29 of optical prism 25 and into the aspheric surface 32 of optical lens 30. Part of the function, beyond chromatic and other aberration correction, of the diffractive optical elements incorporated into surfaces 27 and 29 of optical prism 25 is to produce a flat image of image generator 15. It will of course be understood that diffractive optical elements can, instead of or in addition to, be included in any other surface of the plurality of optical elements in optical magnifier 12. When a diffractive optical element is included in a surface that is substantially normal to the light path, (e.g. inlet surface 32 of optical lens 30), the diffractive optical element is constructed with rotational symmetry. However, when a diffractive optical element is included in a surface positioned so that the light strikes the surface at an angle (e.g. surfaces 27 and 29 of prism 25), the diffractive optical element is constructed with nonrotational symmetry.

Because aspheric surfaces 32 and 34 and the diffractive optical element incorporated into inlet surface 32 make lens 30 relatively complex, it has been found that fabrication of optical lens 30 is best done by molding optical quality plastic. Generally, the preferred method of forming optical lens 30 is by injection molding.

In many applications it may be desirable to include apparatus for focusing the final image. To this end, optical magnifier 12 is mounted on substrate 13 by means of a threaded adjustment 35 which can be rotated by a thumb screw, screwdriver, etc., to move the fixed assembly of prism 25 and optical lens 30 vertically toward and away from substrate 13 and image generator 15. Focusing is accomplished by simply changing the distance between the light inlet (surface 26) of prism 25 and image generator 15.

A significant part of the design of multi-fold magnifier 12 is the use of a solid, multi-fold prism which enables increased angular magnification (reduced effective focal length) in the same volume of space compared to the use of a simple turning mirror in the air, as used in prior art devices. Further, the multi-fold design substantially reduces the depth dimension D of image manifestation apparatus 10 so that apparatus 10 can be easily and conveniently incorporated into portable electronic equipment and the like. Depth dimension D is the total distance between image generator 15 and light outlet surface 34 of optical lens 30. Generally, depth dimension D is in the range of approximately 10 to 15 millimeters and in the specific embodiment illustrated the depth dimension is approximately 11 to 12 millimeters. Also, the thickness of support substrate 13 and the spacing between the upper surface of support substrate 13 and surface 26 of prism 25 will generally be a millimeter or less, so that the depth dimension of optical magnifier 12 alone is substantially similar to the depth dimension of image manifestation apparatus 10.

A typical design specification, or prescription, for the four-fold optical magnifier of FIG. 1 is listed below for example only. The design was done for a wavelength of 605 nanometers.

|  | RDY | THI | RMD | GLA | CCY | THC | GLC |
|---|---|---|---|---|---|---|---|
| OBJ: | INFINITY | −2000.000000 | | | 100 | 100 | |
| STO: | INFINITY | 35.000000 | | | 100 | 100 | |
| 2: | 12.45625 | | 4.500147 | 586000.345000 | 100 | 100 | 100 |
| ASP: | | | | | | | |
| K: | 0.000000 | KC: | 100 | | | | |
| IC: | YES | CUF: | 0.000000 | | CCF: | 100 | |
| A: | −.290414E−04 | B: −.840450E−07 | C: | 0.504410E−09 | D: | 0.224195E−10 | |
| AC: | 100 | BC: | 100 | | CC: | 100 | DC: | 100 |
| 3: | −74.68672 | 0.453640 | | | | 100 | 0 |
| HOE: | | | | | | | |
| HV1: | REA | HV2: | REA | | HOR: | 1 | |
| HX1: | 0.000000E+00 | HY1: | 0.000000E+00 | | HZ1: | −.180005E+04 | |
| CX1: | 100 | CY1: | 100 | | CZ1: | 100 | |
| HX2: | 0.000000E+00 | HY2: | 0.000000E+00 | | HZ2: | −.180005E+04 | |
| CX2: | 100 | CY2: | 100 | | CZ2: | 100 | |
| HWL: | 605.00 | HTO: | ASP | | HCT: | R | |
| HCO/HCC | | | | | | | |
| C1: | −9.7713E−04 | C2: | −6.0418E−06 | | C3: | −4.8685E−08 | |
| C1: | 100 | C2: | 100 | | C3: | 100 | |
| C4: | 1.4525E−09 | C67: | 2.3143E−05 | | C68: | 1.3745E−07 | |
| C4: | 100 | C67: | 100 | | C68: | 100 | |
| C69: | 1.5950E−09 | C70: | −.63171E−12 | | | | |
| C69: | 100 | C70: | 100 | | | | |

-continued

| | | | | | | | |
|---|---|---|---|---|---|---|---|
| 4: | 1.0000E+11 | | 2.584602 | 586000.345000 | 100 | 100 | 100 |
| XDE: | 0.000000 | YDE: | −2.147754 | ZDE: 0.000000 | | | DAR |
| XDC: | 100 | YDC: | 100 | ZDC: 100 | | | |
| ADE: | 0.000000 | BDE: | 0.000000 | CDE: 0.000000 | | | |
| ADC: | 100 | BDC: | 100 | CDC: 100 | | | |
| 5: | 1.0000E+11 | | −4.430747 | REFL 586000.345000 | 100 | 100 | 100 |
| HOE: | | | | | | | |
| HV1: | REA | HV2: | REA | HOR: 1 | | | |
| HX1: | 0.000000E+00 | HY1: | 0.000000E+00 | HZ1: −.180005E+04 | | | |
| CX1: | 100 | CY1 | 100 | CZ1 100 | | | |
| HX2: | 0.000000E+00 | HY2: | 0.000000E+00 | HZ2: −.180005E+04 | | | |
| CX2: | 100 | CY2: | 100 | CZ2: 100 | | | |
| HWL: | 605.00 | HTO: | SPH | HCT: XY | | | |
| HCO/HCC | | | | | | | |
| C3: | −1.7758E−03 | C5: | −9.7402E−04 | C7: 1.0183E−04 | | | |
| C3: | 100 | C5: | 100 | C7: 100 | | | |
| C9: | 5.6935E−05 | C10: | 8.4281E−06 | C12: 7.6707E−06 | | | |
| C9: | 100 | C10: | 100 | C12: 100 | | | |
| C14: | 1.6037E−06 | C16: | −71058E−07 | C18: −1.2059E−06 | | | |
| C14: | 100 | C16: | 100 | C18: 100 | | | |
| C20: | −4.9696E−07 | C21: | −6.5028E−08 | C23: 8.0014E−09 | | | |
| C20: | 100 | C21: | 100 | C23: 100 | | | |
| C25: | 2.8900E−09 | C27: | 3.1228E−08 | | | | |
| C25: | 100 | C27: | 100 | | | | |
| XDE: | 0.000000 | YDE: | 0.300009 | ZDE: 0.000000 | | | BEN |
| XDC: | 100 | YDC: | 100 | ZDC 100 | | | |
| ADE: | 27.500000 | BDE: | 0.000000 | CDE: 0.000000 | | | |
| ADC: | 100 | BDC: | 100 | CDC: 100 | | | |
| 6: | 1.000E+11 | | 6.892273 | TIRO 586000.345000 | 100 | 100 | 100 |
| GL2: | | | | | | | |
| XDE: | 0.000000 | YDE | 0.000000 | ZDE 0.000000 | | | BEN |
| XDC: | 100 | YDC: | 100 | ZDC 100 | | | |
| ADE: | 125.000000 | BDE: | 0.000000 | CDE: 0.000000 | | | |
| ADC: | 100 | BDC: | 100 | CDC: 100 | | | |
| 7: | 1.0000E+11 | | −3.938442 | TIRO 58600.0.345000 | 100 | 100 | 100 |
| GL2: | | | | | | | |
| XDE: | 0.000000 | YDE: | 0.000000 | ZDE: 0.000000 | | | BEN |
| XDC: | 100 | YDC: | 100 | ZDC 100 | | | |
| ADE: | 55.000000 | BDE: | 0.000000 | CDE: 0.000000 | | | |
| ADC: | 100 | BDC: | 100 | CDC: 100 | | | |
| 8: | 1.0000E+11 | | −3.938442 | REFL 5.86000.345000 | 100 | 100 | 100 |
| HOE: | | | | | | | |
| HV1: | REA | HV2: | REA | HOR: 1 | | | |
| HXI: | 0.000000E+00 | HY1: | 0.000000E+00 | RZ1: −.180005E+04 | | | |
| CX1: | 100 | CY1 | 100 | CZ1 100 | | | |
| HX2: | 0.000000E+00 | HY2: | 0.000000E+00 | HZ2: −.180005E+04 | | | |
| CX2: | 100 | CY2: | 100 | CZ2: 100 | | | |
| HWL: | 605.00 | HTO: | SPH | HCT: XY | | | |
| HCO/HCC | | | | | | | |
| C3: | −1.9102E−04 | C5: | −6.5104E−03 | C7: −2.4428E−04 | | | |
| C3: | 100 | CS: | 100 | C7: 100 | | | |
| C9: | 1.2279E−03 | C10: | 6.8869E−04 | C12: 1.3442E−03 | | | |
| C9: | 100 | C10: | 100 | C12: 100 | | | |
| C14: | 4.4938E−04 | C16: | −1.0594E−04 | C18: −1.7139E−04 | | | |
| C14: | 100 | C16: | 100 | C18: 100 | | | |
| C20: | −8.1860E−05 | C21: | 6.7833E−06 | C23: −3.7450E−05 | | | |
| C20: | 100 | C21: | 100 | C23: 100 | | | |
| C25: | 2.6393E−05 | C27: | −1.7925E−05 | | | | |
| C25: | 100 | C27: | 100 | | | | |
| XDE: | 0.000000 | YDE: | 0.000000 | ZDE: 0.000000 | | | BEN |
| XDC: | 100 | YDC: | 100 | ZDC 100 | | | |
| ADE: | −27.500000 | BDE: | 0.000000 | CDE: 0.000000 | | | |
| ADC: | 100 | BDC: | 100 | CDC: 100 | | | |
| 9: | 1.0000E+11 | | 1.086448 | | | 100 | 0 |
| XDE: | 0.000000 | YDE: | 1.947791 | ZDE: 0.000000 | | | DAR |
| XDC: | 100 | YDC: | 100 | ZDC: 100 | | | |
| ADE: | 0.000000 | BDE: | 0.000000 | CDE: 0.000000 | | | |
| ADC: | 100 | BDC: | 100 | CDC: 100 | | | |
| 10: | INFINITY | | 0.900000 | 522000.550000 | 100 | 100 | 100 |
| 11: | INFINITY | | 0.037000 | 520000.550000 | 100 | 100 | 100 |
| 12: | INFINITY | | 0.127025 | | 100 | PIM | |
| IMG: | INFINITY | | −0.127031 | | 100 | 100 | |

Here it should be noted that, because of the very small multi-fold optical magnifier 12 and two dimensional array 15 and the fact that a virtual image is utilized, rather than a direct view display, miniature image manifestation apparatus 10 has overall physical dimensions which allow the convenient incorporation of apparatus 10 into virtually any portable electronic device, e.g. pagers, cellular telephones, two-way radios, data banks, etc.

Figure 2:
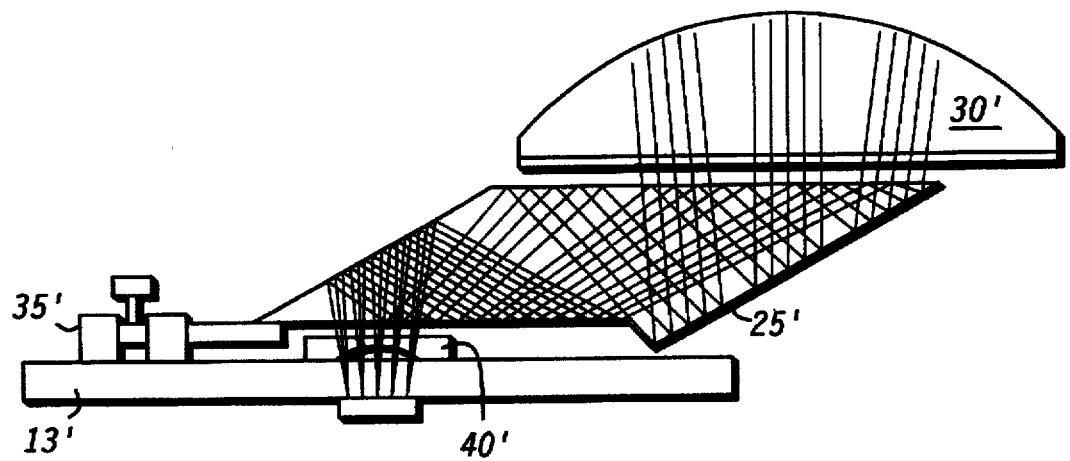
FIG. 2 is a view similar to FIG. 1 of a modified embodiment.

A second embodiment of image manifestation apparatus is illustrated in FIG. 2 wherein components similar to those described in conjunction with FIG. 1 are designated with similar numbers and a prime is added to indicate the different embodiment. In this embodiment, an optical prism 25', an optical lens 30' and a support substrate 13 are similar to those described in conjunction with FIG. 1 and will not be discussed in detail. However, an additional plano concave lens 40' is introduced between support substrate 13 and surface 26' of optical prism 25'. The major purpose of lens 40' is to provide a flat image plane and to this end lens 40' includes a field flattening concave surface, which may also be aspheric to compensate for aberration. Lens 40' may be formed directly in, or as a portion of, the upper surface of support substrate 13. It will be understood, however, that lens 40' is illustrated as a separate lens in this embodiment for ease of explanation. Separate components of course result in additional components and assembly steps which can increase the cost and size of the final structure.

Due to the compact dimensions of magnifier 12, optical lens 40' is extremely thin and may be very difficult to manufacture, especially as a separate lens. The function of lens 40' is implemented, in the embodiment of FIG. 1, in the two diffractive optical elements incorporated into mirrored surfaces 27 and 29. By incorporating diffractive optical elements and aspheric surfaces into various surfaces of the plurality of optical elements, optical functions and aberration correction functions are incorporated into the folds of the optical system in a way that occupies essentially no additional volume.

Depending upon the application, magnification, number of folds and optical path length, the optical elements for the magnifier, with or without lens 40', generally include at least one aspherical surface and at least one diffractive optical element in the light path. In some special applications it may be possible to use all aspherical surfaces and no diffractive optical elements and in some very special applications it may be possible to use only diffractive optical elements to correct aberration. It should be noted, in any case, that the present invention allows aberration correction to be enhanced through the use of aspheric and diffractive structures, sometimes on the same surface, thus avoiding additional conventional elements. It should also be noted that in order to economically form the aspheric and/or diffractive optical elements on the small surfaces of the optical elements that it is generally necessary to injection mold the optical elements.

Figure 3:
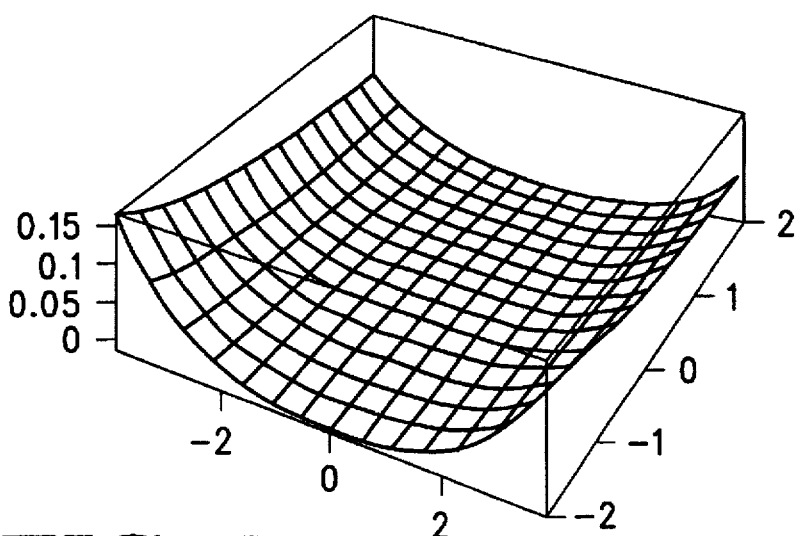
FIG. 3 is a three dimensional plot illustrating the phase correction required at a surface of the multi-fold optical magnifier illustrated in FIG. 1.
Figure 4:
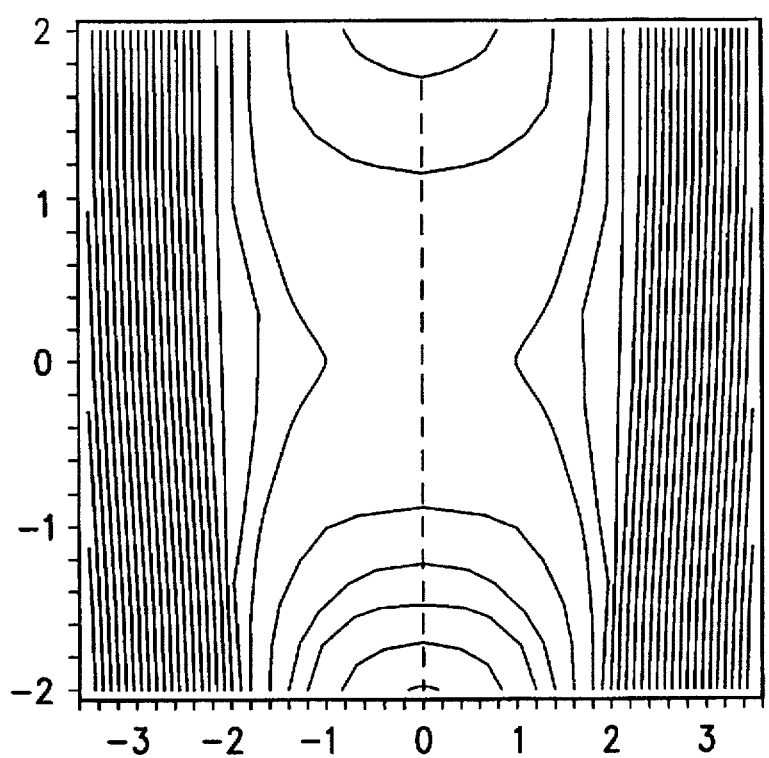
FIG. 4 is a contour plot of the three dimensional surface illustrated in FIG. 3, which simulates the pattern of a diffractive optical element built into a surface of the multi-fold optical magnifier of FIG. 1.

Referring to FIGS. 3 through 6, specific three dimensional and contour plots showing the phase correction functions implemented in surfaces 27 and 29 of four-fold optical magnifier 12 in FIG. 1 are illustrated. Specifically, FIG. 3 is a three dimensional plot illustrating the phase correction function produced at surface 27 and FIG. 4 is a contour plot of surface 27. The contour plot simulates the surface configuration of the diffractive optical element. Similarly, FIG. 5 is a three dimensional plot illustrating the phase correction function produced at surface 29 and FIG. 6 is a contour plot of surface 29 It will of course be understood that surfaces 27 and 29 are specifically designed for the size and configuration of four-fold magnifier 12 and different sizes, different numbers of folds, etc. will require different diffractive surface configurations.

Figure 7:
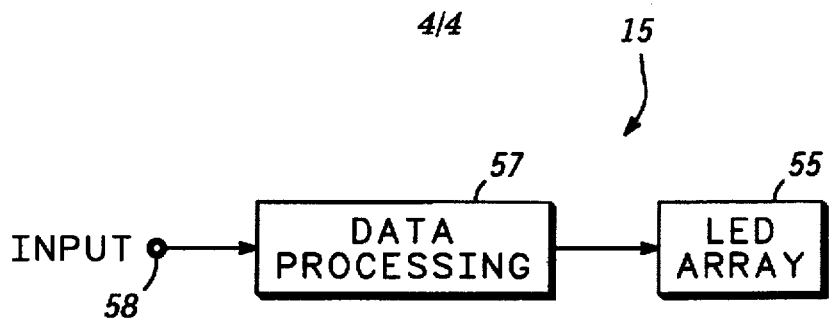
FIG. 7 is a simplified block diagram of an image generator associated with the apparatus of FIG. 1.

Image generator 15 is illustrated in more detail in FIG. 7 and includes, for example, semiconductor electronics such as a light emitting device (LED) array 55 driven by data processing circuits 57. The LEDS may be, for example, organic or inorganic light emitting diodes, vertical cavity surface emitting lasers, field emission devices, etc. Data processing circuits 57 include, for example, logic and switching circuit arrays for controlling each LED in LED array 35, drivers and the like. Data processing circuits 57 include, in addition to or instead of the logic and switching arrays, a microprocessor or similar circuitry for receiving data at an input terminal 58 and processing the data to produce a desired real image on a device such as LED array 55.

Figure 8:
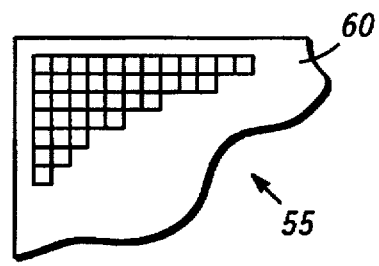
FIG. 8 is an enlarged view in top plan of an array of light emitting devices, portions thereof broken away, forming a portion of the image generator of FIG. 4.

In this specific embodiment LED array 55 is utilized because of the extremely small size that can be achieved and because of the simplicity of construction and operation. Referring specifically to FIG. 8, a plan view of two dimensional LED array 55 is illustrated in which pixels are formed in a regular pattern of rows and columns on a single substrate (e.g. a semiconductor chip) 60. Each pixel includes at least one LED, with additional parallel LEDs being included, if desired, for color, additional brightness and/or redundancy. By addressing specific pixels by row and column in a well known manner, the specific pixels are energized to produce a real image. Digital or analog data is received at input terminal 58 and converted by data processing circuits 57 into signals capable of energizing selected pixels to generate the predetermined real image. The digital or analog data is received from any data source, such as a communication receiver, a memory or data bank, or other portable electronic device, etc.

It will be understood by those skilled in the art that LED array 55 and substrate 60 are greatly enlarged in FIG. 8. Also, while data processing circuits 57 are represented by a separate block, it will be understood that in some applications they may be formed around the edge of array 55 on substrate 60. The actual size of substrate 60 is on the order of a few milli-meters (e.g. 3 to 10) along each side with each LED being on the order of 5 to 50 microns on a side (or in diameter if the LED is round). Because of the extremely small size of substrate 60, drive lines or metal connecting traces between LEDs, have a very small cross-section, which severely limits their current carrying capacity, or current density. Referring to FIG. 8 for example, in one typical operation only a row at a time is addressed or "turned ON". Thus, the metal trace for each column needs to carry only sufficient current for one LED (the one LED in the row which is ON). However, all of the LEDs in the ON row could potentially be turned ON simultaneously. Thus, the metal trace for the ON row, which can potentially be required to carry current for however many LEDs are in the row (e.g. 100 to 1500 LEDs), must carry many times as much current as the column metal traces.

Figure 9:
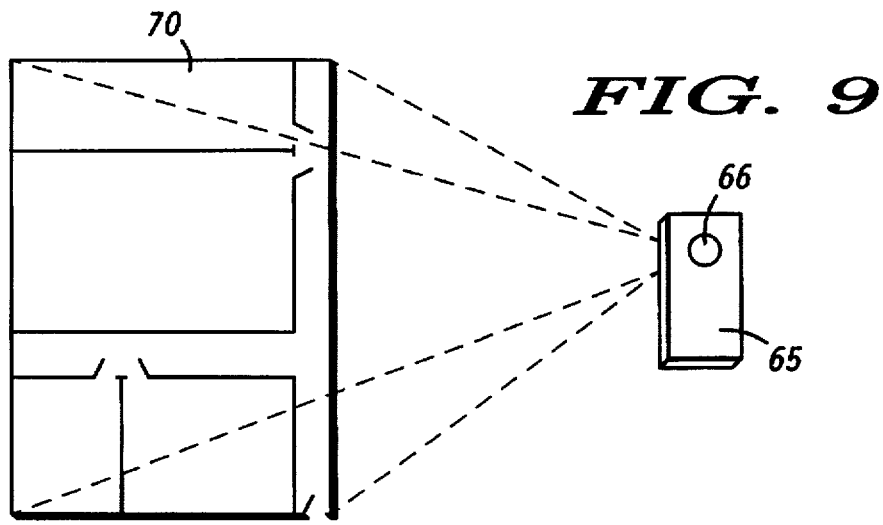
FIG. 9 is a view in perspective illustrating a typical view as seen by the operator of portable communications equipment employing the image manifestation apparatus of FIG. 1.

Referring to FIG. 9, a perspective view of portable, or hand-held, electronics equipment 65 is illustrated with miniature image manifestation apparatus in accordance with the present invention mounted therein so that only a viewing aperture 66 is visible. Generally, viewing aperture 66 is the same as viewing aperture 20, explained in conjunction with FIG. 1. Further, FIG. 9 illustrates a typical view 70 seen by an operator looking into viewing aperture 66 of electronics equipment 65, which view 70 appears to be behind electronics equipment 65. View 70 could be, for example, a floor plan of a building about to be entered by the operator (a policeman). The floor plan is on file at the police station and, when assistance is requested by the policeman, the station simply transmits the previously recorded plan. Similarly, electronics equipment 65 might be utilized to transmit pictures of missing persons or wanted criminals, maps, extremely long messages, etc. Many other variations, such as silent receiver operation wherein the message appears in viewing aperture 66 instead of audibly, are possible. Also, if electronics equipment 65 is a data bank, view 70 may be a map, list of numbers or addresses, etc. which are simply stored in memory.

Thus, an optical system with the attributes of being compact and inexpensive, and including high quality optics with large angular magnification, while compactly correcting for aberrations, has been disclosed. Because of its novel construction, multi-fold optical magnifier 12 or 12' can be manufactured very small, with high angular magnification and very inexpensively. Also, while injection molding the various optical elements to incorporate the diffractive optical elements and/or the aspherical surfaces is considered the optimum manufacturing method, it is also the least expensive. Further, because of the small size, high angular magnification and rugged construction of the multi-fold optical magnifier it can be used in conjunction with miniature image manifestation apparatus 10 and/or in virtually any portable electronics equipment.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

What is claimed is:

1. A multi-fold optical magnifier comprising:
    a plurality of optical elements including an optical prism having a light inlet and a light outlet with at least one reflecting surface optically positioned between the inlet and the outlet so as to direct light from the inlet to the outlet and an optical lens positioned adjacent the light outlet of the prism so as to receive light from the prism, the optical prism being constructed to internally reflect the light four times between the light inlet and the light outlet, the optical prism including first, second, third and fourth surfaces with the first and third surfaces being parallel and spaced apart and the second and fourth surfaces being parallel and spaced apart, and the first surface of the optical prism defining the light inlet and the third surface of the optical prism defining the light outlet;
    the plurality of optical elements defining a light path from a path inlet to a path outlet with at least one aspheric surface formed on one of the plurality of optical elements and positioned in the light path for aberration correction and at least one diffractive optical element formed on one of the plurality of optical elements and positioned in the light path so as to provide further aberration correction; and
    the plurality of optical elements being constructed to angularly magnify an image source at the light inlet of the first optical element by greater than ten.

2. A multi-fold optical magnifier as claimed in claim 1 wherein the optical lens of the plurality of optical elements is positioned in overlying relationship to the third surface of the optical prism so as to receive light from the light output of the optical prism, the optical lens includes a light inlet surface positioned adjacent the third surface of the optical prism and a light outlet surface opposite the light inlet surface.

3. A multi-fold optical magnifier as claimed in claim 2 wherein the optical prism and the optical lens are constructed with a total distance in the range of 10 to 15 mm between the first surface of the optical prism and the light outlet surface of the optical lens.

4. A multi-fold optical magnifier as claimed in claim 3 wherein the optical prism and the optical lens are constructed with a total distance in the range of 11 to 12 mm between the first surface of the optical prism and the light outlet surface of the optical lens.

5. A multi-fold optical magnifier as claimed in claim 4 wherein the plurality of optical elements is constructed to angularly magnify an image source at the light inlet of the plurality of optical elements by approximately fifteen.

6. A multi-fold optical magnifier as claimed in claim 2 wherein the light outlet surface of the optical lens is an aspheric surface.

7. A multi-fold optical magnifier as claimed in claim 2 wherein the light inlet surface of the optical lens includes a diffractive optical element on an aspheric base surface.

8. A multi-fold optical magnifier as claimed in claim 1 wherein the second surface and the fourth surface of the optical prism each include a diffractive optical element.

9. A multi-fold optical magnifier as claimed in claim 1 wherein the second surface of the optical prism is positioned to receive light from the light input of the optical prism and reflect received light onto the first surface, the first surface is positioned to reflect light received from the second surface onto the third surface, the third surface is positioned to reflect light received from the first surface onto the fourth surface, and the fourth surface is positioned to reflect light received from the third surface through the light outlet of the optical prism.

10. A multi-fold optical magnifier as claimed in claim 9 wherein the second surface and the fourth surface of the optical prism each include aluminized portions.

11. A multi-fold optical magnifier as claimed in claim 10 wherein the first surface and the third surface of the optical prism each receive light at an angle to the first surface and the third surface, respectively, which is less than 42° so that total internal reflection occurs.

12. A multi-fold optical magnifier as claimed in claim 1 wherein the plurality of optical elements includes a first optical element having an aspheric field flattening light inlet.

13. A four-fold optical magnifier comprising:
    an optical prism including first, second, third and fourth surfaces with the first and third surfaces being parallel and spaced apart and the second and fourth surfaces being parallel and spaced apart and the first surface of the optical prism defining a light input and the third surface of the optical prism defining a light output;
    the optical prism being further constructed with the second surface of the optical prism positioned to receive light from the light input of the optical prism and reflect received light onto the first surface, the first surface positioned to reflect light received from the second surface onto the third surface, the third surface positioned to reflect light received from the first surface onto the fourth surface, and the fourth surface positioned to reflect light received from the third surface through the light outlet of the optical prism;
    an optical lens positioned adjacent the light outlet of the prism so as to receive light from the prism, the optical lens having a light inlet surface positioned adjacent the light outlet of the optical prism and an aspheric light outlet surface positioned in the light path for aberration correction;
    the optical prism and the optical lens defining a light path from the light inlet of the optical prism to the light outlet of the optical lens with at least one diffractive optical element formed on a surface of one of the optical prism and the optical lens and positioned in the light path so as to provide further aberration correction; and the optical prism and the optical lens being constructed to angularly magnify an image source at the light inlet of the optical prism by greater than ten.

14. A four-fold optical magnifier as claimed in claim 13 wherein the second surface and the fourth surface of the optical prism each include aluminized portions.

15. A four-fold optical magnifier as claimed in claim 14 wherein the first surface and the third surface of the optical prism each receive light at an angle to the first surface and the third surface, respectively, which is less than 42° so that total internal reflection occurs.

16. A four-fold optical magnifier as claimed in claim 13 wherein the second surface and the fourth surface of the optical prism each include a diffractive optical element.

17. A four-fold optical magnifier as claimed in claim 13 wherein the optical prism and the optical lens are constructed with a total distance in the range of 10 to 15 mm between the first surface of the optical prism and the light outlet surface of the optical lens.

18. A four-fold optical magnifier as claimed in claim 17 wherein the optical prism and the optical lens are constructed with a total distance in the range of 11 to 12 mm between the first surface of the optical prism and the light outlet surface of the optical lens.

19. A four-fold optical magnifier as claimed in claim 18 wherein the optical prism and the optical lens are constructed to angularly magnify an image source at the first surface of the optical prism by approximately fifteen.

20. A method of manufacturing a multi-fold optical magnifier comprising the steps of:

forming a plurality of optical elements including an optical prism having a light inlet and a light outlet with at least one reflecting surface optically positioned between the inlet and the outlet so as to direct light from the light inlet to the light outlet and an optical lens having a light inlet surface and a light outlet surface, and forming the optical prism to include first, second, third and fourth surfaces with the first and third surfaces being parallel and spaced apart and the second and fourth surfaces being parallel and spaced apart, and the first surface of the optical prism defining the light inlet and the third surface of the optical prism defining the light outlet;

the step of forming further including forming at least one aspheric surface on one of the optical prism and the optical lens, and forming at least one diffractive optical element on a surface of one of the optical prism and the optical lens;

mounting the plurality of optical elements so as to define a light path from the light inlet of the optical prism to the light outlet surface of the optical lens with the light inlet surface of the lens being positioned adjacent the light outlet of the prism so as to receive light from the prism, the aspheric surface and the diffractive optical element being positioned in the light path to correct for aberration; and the forming and mounting steps further being performed so that the optical prism and the optical lens define a total distance in the range of 10 to 15 mm between the first surface of the optical prism and the light outlet surface of the optical lens.

21. A method of manufacturing a multi-fold optical magnifier as claimed in claim 20 wherein the forming and mounting steps are further performed so that the plurality of optical elements angularly magnify an image source at the first surface of the optical prism by greater than ten.

22. A method of manufacturing a multi-fold optical magnifier as claimed in claim 21 wherein the steps of forming the plurality of optical elements includes molding the optical prism and the optical lens from optical quality plastic.

23. A method of manufacturing a multi-fold optical magnifier as claimed in claim 22 wherein the step of molding the optical lens includes injection molding the optical lens and a diffractive optical element on the light inlet surface of the optical lens.

24. Image manifestation apparatus comprising;

an image generator including a two dimensional array of light emitting devices formed on a single substrate and driver circuits coupled to the light emitting devices and including a data input terminal, the light emitting devices being individually addressable by the driver circuits so as to generate a real image including one of a plurality of lines of alpha-numerics and graphics from data received at the data input; and a multi-fold optical magnifier positioned adjacent the image generator so as to receive the real image generated by the image generator and produce a virtual image at an output thereof, the magnifier including a plurality of optical elements including an optical prism having a light inlet and a light outlet with at least one reflecting surface optically positioned between the inlet and the outlet so as to direct light from the inlet to the outlet, a first optical element having an aspheric field flattening light inlet, the first optical element being positioned between the two dimensional array of light emitting devices and the light inlet of the optical prism so as to direct light from the two dimensional array to the light inlet of the optical prism, and an optical lens positioned adjacent the light outlet of the prism so as to receive light from the prism, the plurality of optical elements defining a light path from a path inlet to a path outlet with at least one aspheric surface formed on one of the plurality of optical elements and positioned in the light path for aberration correction and at least one diffractive optical element formed on one of the plurality of optical elements and positioned in the light path so as to provide further aberration correction; and the plurality of optical elements being constructed to angularly magnify the real image at the light inlet of the first optical element by greater than ten.

25. Image manifestation apparatus as claimed in claim 24 wherein the plurality of optical elements define a total distance in the range of 10 to 15 millimeters between the two dimensional array and the light outlet surface of the optical lens.

26. Image manifestation apparatus as claimed in claim 24 wherein the multi-fold optical magnifier is mounted with limited movement toward and away from the two dimensional array of light emitting devices so as to provide focusing of the virtual image at the output of the multi-fold optical magnifier.

27. Image manifestation apparatus comprising;

an image generator including a two dimensional array of light emitting devices formed on a single substrate and driver circuits coupled to the light emitting devices and including a data input terminal, the light emitting devices being individually addressable by the driver circuits so as to generate a real image including one of a plurality of lines of alpha-numerics and graphics from data received at the data input; and a multi-fold optical magnifier positioned adjacent the image generator so as to receive the real image generated by the image generator and produce a virtual image at an output thereof, the magnifier including a plurality of optical elements including an optical prism having a light inlet and a light outlet with at least one reflecting surface optically positioned between the inlet and the outlet so as to direct light from the inlet to the outlet, a first optical element having an aspheric field flattening light inlet the first optical element being positioned between the two dimensional array of light emitting devices and the light inlet of the optical prism so as to direct light from the two dimensional array to the light inlet of the optical prism, and an optical lens positioned adjacent the light outlet of the prism so as to receive light from the prism, the plurality of optical elements defining a light path from a path inlet to a path outlet with at least one aspheric surface formed on one of the plurality of optical elements and positioned in the light path for aberration correction and at least one diffractive optical element formed on one of the plurality of optical elements and positioned in the light path so as to provide further aberration correction; and the plurality of optical elements defining a total distance in the range of 10 to 15 millimeters between the two dimensional array and the light outlet surface of the optical lens.

28. Image manifestation apparatus as claimed in claim 27 wherein the total distance is in the range of 11 to 12 millimeters with the plurality of optical elements being constructed to angularly magnify the real image at the light inlet of the optical prism by approximately fifteen.

29. Image manifestation apparatus as claimed in claim 27 wherein the multi-fold optical magnifier is mounted with limited movement toward and away from the two dimensional array of light emitting devices so as to provide focusing of the virtual image at the output of the multi-fold optical magnifier.

30. Image manifestation apparatus comprising;

an image generator including a two dimensional array of light emitting devices formed on a single substrate and driver circuits coupled to the light emitting devices and including a data input terminal, the light emitting devices being individually addressable by the driver circuits so as to generate a real image including one of a plurality of lines of alpha-numerics and graphics from data received at the data input; and a four-fold optical magnifier positioned adjacent the image generator so as to receive the real image generated by the image generator and produce a virtual image at an output thereof, the magnifier including an optical prism including first, second, third and fourth surfaces with the first and third surfaces being parallel and spaced apart and the second and fourth surfaces being parallel and spaced apart and the first surface of the optical prism defining a light input and the third surface of the optical prism defining a light output;

the optical prism being further constructed with the second surface of the optical prism positioned to receive light from the light input of the optical prism and reflect received light onto the first surface, the first surface positioned to reflect light received from the second surface onto the third surface, the third surface positioned to reflect light received from the first surface onto the fourth surface, and the fourth surface positioned to reflect light received from the third surface through the light outlet of the optical prism;

an optical lens positioned adjacent the light outlet of the prism so as to receive light from the prism, the optical lens having a light inlet surface positioned adjacent the light outlet of the optical prism and an aspheric light outlet surface positioned in the light path for aberration correction;

the optical prism and the optical lens defining a light path from the light inlet of the optical prism to the light outlet of the optical lens with at least one diffractive optical element formed on a surface of one of the optical prism and the optical lens and positioned in the light path so as to provide further aberration correction; and the optical prism and the optical lens being constructed to angularly magnify an image source at the light inlet of the optical prism by greater than ten.

31. Image manifestation apparatus as claimed in claim 30 including in addition a first optical element having an aspheric field flattening light inlet, the first optical element being positioned between the two dimensional array of light emitting devices and the light inlet of the optical prism so as to direct light from the two dimensional array to the light inlet of the optical prism.

32. Image manifestation apparatus as claimed in claim 30 wherein the multi-fold optical magnifier is mounted with limited movement toward and away from the two dimensional array of light emitting devices so as to provide focusing of the virtual image at the output of the multi-fold optical magnifier.

33. Image manifestation apparatus as claimed in claim 30 wherein the optical prism and the optical lens define a total distance in the range of 10 to 15 millimeters between the two dimensional array and the light outlet surface of the optical lens.

* * * * *